3,825,559
OPTICAL RESOLUTION OF DL-TRYPTOPHAN
Hideo Tazuke, Toshio Kitahara, and Hiroo Kageyama, Kanagawa-ken, Japan, assignors to Ajinomoto Co., Inc., Tokyo, Japan
No Drawing. Filed Sept. 10, 1971, Ser. No. 179,587
Claims priority, application Japan, Sept. 12, 1970, 45/80,177
Int. Cl. C07d 27/60
U.S. Cl. 260—326.14 T         1 Claim

ABSTRACT OF THE DISCLOSURE

DL-tryptophan hydrohalide is resolved into its optically active enantiomorphs by forming a free hydrogen halide containing saturated or supersaturated solution of said DL-tryptophan hydrohalide, and contacting said solution with crystals of one of said enantiomorphs.

BACKGROUND OF THE INVENTION

Field of the Invention

This invention relates to a process for the optical resolution of DL-tryptophan, and more particularly, to a process for resolving a DL-tryptophan 1 hydrohalide i.e., DL-tryptophan monohydrohalide, into the optically active enantiomorphs thereof with the use of seed crystals.

Amino acids such as tryptophan are generally useful only in the form of the L-isomer, which is the form ordinarily occurring in nature. When such compounds are synthesized by chemical procedure, the products obtained are almost invariably racemates.

Physico-chemical ("seeding processes" and etc.), chemical (processes using the differential solubility of diastereoisomeric salts and etc.) and biological methods have been devised for resolving racemates of organic compounds. But, generally resolution by "seeding processes" is thought to be most practical technique in order to produce optically active isomers on an industrial scale and at a low cost.

The technique of resolution by "seeding" is well known, and usually involves substantively contacting a saturated, or supersaturated solution of a racemate, in which the optically active enantiomorph can exist as a solid precipitate with seed crystals of the enantiomorph, to preferentially and selectively crystallize only one of the two enantiomorphs of the racemate. The crystallized, optically active enantiomorph is then separated by conventional means. The supersaturated racemate solutions may be prepared by any known manner such as by concentrating or cooling a dilute solution, by partially neutralizing a solution, by the addition of common ions to a dilute solution of the racemate or by the adding of salts to a dilute solution.

The contacting of the supersaturated racemate solution with seed crystals of the optically active enantiomorph, may be accomplished by, (1) inoculating the former with the latter, separately prepared, (2) concentrating a dilute racemate solution in which the previously prepared seed crystals of one optically active enantiomorph had been added, (3) crystallizing the optically active enantiomorph from an optically impure racemate solution, having an excess of one enantiomorph over the other and, then sequentially or simultaneously concentrating the solution (see Japanese patent publication No. 17,835/64 and Jap. pat. publn. No. 1,171/65. In those publications, the crystallized optically active enantiomorph is used as the seed crystals as it is crystallized. The "seeding process" resolution of this invention as will hereafter be described, also includes this mode, of course), (4) suspending seed crystals in a vessel equipped with a suspending machine through which a supersaturated racemate solution is circulated (see Jap. pat. publn. No. 9,971/62) or, suspending seed crystals in an ascending circulating supersaturated racemate solution current (see Jap. pat. publn. No. 17,710/61), (5) contacting the racemate solution with the two enantiomorphs simultaneously, but wherein each one is present in particle size ranges which are sufficiently different from each other, so as to be able to fractionate the crystals into the two enantiomorphs by use of this particle size difference (see Jap. pat. publn. No. 9,069/62), and (6) adding an organic solvent, acid, alkali (see Jap. pat. publn. No. 2,972/56 and Jap. pat. publn. No. 2,309/62) or other, into the racemate solution, so long as the optically active enantiomorph can exist as a solid precipitate in the solution.

Other modes of resolution by "seeding" may be analogized from the literature concerning "seeding process" of resolution racemic amino acids, and particularly racemic glutamic acid.

Supersaturated solutions of DL-tryptophan, in which an optically active enantiomorph of free tryptophan can exist as a solid precipitate, has heretofore not been known. Hence, the optical resolution of DL-tryptophan in a free form by a "seeding process" was considered to be impossible. Currently the only known method of resolving DL-tryptophan is by resolving an acylated compound of DL-tryptophan, in the form of a salt (see Jap. pat. publn. No. 6,183/63, Jap. pat. publn. No. 17,835/64 and Jap. pat. publn. No. 23,659/65). This method is undesirable however because of the necessity of an acylation reaction, which can be quite troublesome.

SUMMARY OF THE INVENTION

It has now been found that in a supersaturated solution of DL-tryptophan 1 hydrohalide, containing hydrogen halide, the optically active enantiomorph can exist as a solid precipitate. This finding is the basis for this invention.

It was believed that tryptophan is decomposed by mineral acids, and the literature indicates that tryptophan is stable only in dark places ("Tryptophan," P6), the third collection of "Amino Acid Series," published 1960 by Nankodo, Japan). Accordingly, it was believed that tryptophan could not be obtained by the acid hydrolyses of proteins. On the other hand, it was known that racemic tryptophan could be obtained by alkali hydrolyses of proteins. It was also known that tryptophan can be isolated from natural compounds by enzyme decomposition, and particularly, by decomposition of casein by trypsin. ("Tanpakushitsu Kagaku, I," P562, published 1970 by Kyoritsu Shuppan, Japan).

After carefully studying the interactions between tryptophan and hydrochloric acid however, we have found that a solution of tryptophan 1 hydrochloride which is commercially available which is characterized by a deep color and which has the capability of producing materials like Humin, can exist stably within the limits of analytical error. It has been that the coloration of the solution is influenced more by oxygen from the air, than by heat, since it has been found that a sample which has been violently shaken at 80° C., will color more deeply than a sample which is heated to near the boiling point.

Furthermore, it has been found that in the phase equilibrium of a tryptophan-hydrogen chloride-water system, tryptophan is sequentially converted into free tryptophan, tryptophan ½ hydrochloride i.e., tryptophan hemihydrochloride, [(Trp)$_2$HCl], and tryptophan 1 hydrochloride [Trp.HCl], as solid precipitates, in proportion to the increase in the concentration of hydrogen chloride. Moreover, it was confirmed that the solid precipitates of tryptophan and tryptophan ½ hydrochloride are racemic compounds as is the solid precipitates of tryptophan 1 hydrochloride racemic mixture. In this connection, DL-tryptophan ½ hydrochloride, can easily be identified, for instance, by the analyses of amino form nitrogen (Van Slyke method), and the hydrochloric acid content of the hydrochloride. It was found that the composition of the liquid phase, in which tryptophan 1 hydrochloride can exist stably as a solid precipitates, is influenced by temperature and other conditions so that at a temperature of 30° C., the composition of the saturated solution of tryptophan 1 hydrochloride will have a mole ratio of greater than about 1.2, hydrogen chloride to tryptophan, in a solvent of dilute hydrochloric acid solution containing more than 1% of free hydrogen chloride. It was firstly confirmed that these same effects occur in the case of other hydrogen halides, other than hydrogen chloride.

On the basis of the above findings we have now discovered a process for resolving a DL-tryptophan into its optically active enantiomorphs, which comprises contacting a supersaturated solution of the DL-tryptophan 1 hydrohalide, containing a hydrogen halide, with the crystals of one of the isomers.

DETAILED DESCRIPTION OF PREFERRED EMBODIMENTS

In carrying out optical resolution of DL-tryptophan, in accordance with the process of this invention, free hydrogen halide, corresponding to the supersaturated solution of DL-tryptophan 1 hydrohalide, must be added to the solution. This operation may be carried out by passing gaseous hydrogen halide into the solution or by adding hydrohalogenic acid to the solution. The most suitable concentration of hydrogen halide in the above-mentioned racemate solution, may be selected according to preselected conditions. For instance, when hydrogen chloride is used solutions with a concentration of more than about 1%, and preferably, in practice, solutions with a concentration of about 5%, may be used. At these concentrations, the process is stable because tryptophan 1 hydrochloride is a solid precipitate and is not influenced by deviations in the concentration of hydrochloric acid. Higher concentrations of hydrogen chloride, in which the racemate can be resolved, are not economically desirable, from the standpoint of the stability of tryptophan, the solubility of tryptophan 1 hydrochloride, and the materials required for the apparatus.

The essential aspect of this invention is the resolution of DL-tryptophan by a "seeding process," which comprises contacting a supersaturated solution of DL-tryptophan 1 hydrohalide with crystals of one of the isomers and thereafter permitting crystals of one of the enantiomorphs to grow. DL-tryptophan 1 hydrohalide may be used as the starting material to be resolved, and a supersaturated solution of the racemate to be resolved is formed in which a proper amount of the corresponding hydrogen halide has been added.

Accordingly, in carrying out optical resolution in accordance with the process of this invention, any conventional condition and means, which has been used in the optical resolution of racemic organic compounds by "seeding processes" as mentioned above, in the discussion of prior art, may be properly employed. Any of those processes as described above is, of course, within the technical range of this invention.

There are many advantages to the resolution in the form of tryptophan 1 hydrohalide.

When tryptophan is separated in the form of the tryptophan 1 hydrochloride from the synthetic reaction mixture, the separated tryptophan 1 hydrochloride will be free of impurities so that the tryptophan 1 hydrochloride may be subjected to the resolution as it is separated. Also, when tryptophan is separated in the form of tryptophan ½ hydrochloride, the separated tryptophan ½ hydrochloride will be free of impurities. Since tryptophan ½ hydrochloride is a racemic compound, it can be converted into tryptophan 1 hydrochloride, and the tryptophan 1 hydrochloride resolved.

The following experiment description is provided herein for purposes of illustration.

EXPERIMENTAL 0.06 mole hydantoin of tryptophan, synthesized in the same manner as disclosed in Nippon Kagaku Zasshi, 86, 856 (1965), and 50 ml. water, were added to 28.8 g. of an aqueous 30% sodium hydroxide solution. This mixture was heated at 150° C. for an hour in an autoclave and the hydrolyzed solution was concentrated to 75 g.

18.5 ml. of conc. hydrochloric acid were added to 25 g. of the concentrated solution, and the mixture was stirred. Pillar-shaped crystals were precipitated and separated. The dried crystals weighed 3.25 grams. Though the mother liquor colored easily, the crystals obtained did not contain colored materials. It was confirmed by neutralization titration that these crystals were tryptophan 1 hydrochloride.

3.15 g. of the crystals mentioned above were dissolved in 10 ml. of water. The solution was neutralized with an aqueous 10% sodium hydroxide solution to about pH 6. The precipitated crystals were separated and then washed with ethanol-ether. 2.5 grams of DL-tryptophan were collected. 0.1 g. of these crystals were dissolved in 20 ml. of 2 N hydrochloric acid, and the percent transmission of this solution was found to be 97%.

Another 25 g. of concentrated solution were added to 7 ml. of an aqueous 35% hydrochloric acid solution. The mixture formed a homogeneous solution. This solution was concentrated under reduced pressure and cooling. Needle-shaped crystals were formed. After cooling under reduced pressure for a few minutes, the precipitated crystals were separated. These crystals, which had a white color, weighed 1.8 grams, and were identified as tryptophan ½ hydrochloride by neutralization titration of hydrochloric acid and by the analyses of the amino form nitrogen. 1 gram of tryptophan ½ hydrochloride crystals was dissolved in 5 ml. of water. This solution was neutralized. The percent transmission of the obtained DL-tryptophan crystals was found to be 98%.

For comparison, the remaining 25 g. of the above concentrated solution was neutralized with an aqueous 35% hydrochloric acid solution to about pH 6 and the DL-tryptophan, which was not formed passing through the hydrochloride, was obtained. The percent transmission of the obtained DL-tryptophan crystals was found to be 90%. The crystals appeared to be a yellow ocher color.

The optically active tryptophan 1 hydrochloride, obtained by this invention, may be used as is, or in the form of another salt or in a dehydrohalogenated form i.e. free tryptophan.

The following examples are further illustrative of the present invention, and it will be understood that the invention is not limited thereto.

EXAMPLE 1

50 ml. of solution saturated with DL-tryptophan 1 hydrochloride, using 4.7% aqueous hydrochloric acid solution as a solvent, at 50° C. was prepared in a three neck flask equipped with a stirrer which was kept at 50° C. It was confirmed that no suspension of crystals were present. The solution was cooled gradually while stirring to 49° C., and seeded with 0.5 g. L-tryptophan hydrochloride crystals. After seeding, the mixture was further cooled to 40° C. over 30 minutes.

The growth of the added crystals was observed and the optical rotation of the mother liquor separated from crystals was $\alpha = -0.041°$. From this datum, it was obviously confirmed that the mother liquor is optically inclined to the optical antipode to seed crystals. Here, the optical rotation of the solution, in which about three times the quantity of sodium hydroxide, by mole, to tryptophan in the mother liquor, had been added.

In a comparison experiment, which was conducted in essentially the same manner as the above mentioned experiment, except water was used instead of dilute hydrochloric acid as the solvent the added seed crystals were dissolved and new needle-shaped crystals were precipitated. As a result of analyses, it was clear that these crystals are DL-tryptophan ½ hydrochloride. From the measurement of the optical resolution of the mother liquor, it was clear that the resolution was unsuccessful. That is to say, the mother liquor was optically inclined to the added crystals.

EXAMPLE 2

In carrying out the resolution of the racemate the following apparatus was used. Two resolution columns for L- and D-form which both have an inside diameter of 12 millimeters and a height of 100 millimeters, were arranged in a line. The overflow solution from both columns was admixed, and heated in a snake-like tube set in an oil bath maintained at 70° C. It was then cooled to 50° C. in a thin tube for cooling and set in a constant temperature bath of 50° C. The solution was then supplied to the above-mentioned two columns in equal parts, divided by the pump (see Jap. pat. publn. No. 17,710/61). The holdup throughout the system was about 1200 milliliters, and the velocity of the solution passing upward through the resolution column, i.e., the velocity of the growth path, was controlled with the bypass, at a rate of about 1.6 centimeters per second.

645 grams DL-tryptophan 1 hydrochloride were dissolved by heating in 1027 ml. of a hydrochloric acid solution, containing about 5% hydrogen chloride by weight. 5 grams of activated carbon was added to the prepared solution for decolorization and the mixture was filtrated. The filtrate was fed to the above-mentioned apparatus and a solution of a fixed concentration (about 38% by weight of tryptophan hydrochloride) was adjusted in the system.

When the system was stable, 1 gram of D-tryptophan hydrochloride crystals and 1 gram L-tryptophan hydrochloride crystals (both optical purity 100%), in an equal size of 24 meshes to 32 meshes were added as seed crystals to the resolution column for D-form and the resolution column for L-form. The operation was maintained for an hour to grow the seed crystals. The grown crystals were drawn from the mixtures in the resolution columns by means of a siphon, washed with acetone and dried in air. 1.94 g. of L-tryptophan 1 hydrochloride, having an optical purity of 97%, and 1.90 g. of D-tryptophan 1 hydrochloride, having an optical purity of 98%, were respectively obtained. As result, it was found that 0.88 g. of L-form and 0.86 g. of D-form were respectively resolved by crystallization.

Furthermore, since the supersaturation of mother liquor passing through the resolution columns was not completely broken down after 1 hour of resolving operations, 1 gram D-tryptophan 1 hydrochloride and 1 gram L-tryptophan 1 hydrochloride crystals were again seeded and the resolving operation was continued for 2 hours. 2.81 g. of L-tryptophan 1 hydrochloride having an optical purity of 96%, and 3.05 g. D-tryptophan 1 hydrochloride, having an optical purity of 96% were obtained. As a result, it was found that 1.70 g. of L-form and 1.93 g. of D-form were respectively resolved by crystallization.

10 grams DL-tryptophan 1 hydrochloride were dissolved as a supplement in the overflow solution, after the above described second resolving run, and 1 gram D-tryptophan 1 hydrochloride crystals and 1 gram L-tryptophan 1 hydrochloride crystals were added to each resolution column. The resolving run was carried out for 2 hours. 3.72 g. of L-tryptophan 1 hydrochloride, having an optical purity of 95%, and 3.41 g. of D-tryptophan 1 hydrochloride, having an optical purity of 95%, were obtained. As a result, it was found that 2.53 g. of L-form and 2.24 g. of D-form, were resolved.

Overall results showed about 5 grams D- and L-form, respectively, resolved by the series of runs described above.

In this connection, 3.72 grams of L-form, obtained in the third resolving procedure, were dissolved in 50 ml. of water. The solution was then adjusted to a pH 6 with an aqueous 10% sodium hydroxide solution. After 30 minutes, precipitated crystals were separated by filtration and washed with ethanol and with ether. The crystals obtained weighed 2.3 g. and were found to be L-tryptophan, having an optical purity of 99.3%.

EXAMPLE 3

517 grams DL-tryptophan were dissolved at 60° C. in 1144 g. of hydrochloric acid solution, containing 11.4% hydrogen chloride by weight. This solution was cooled to 49.5° C., and seeded with 30 grams L-tryptophan 1 hydrochloride crystals, having a particle size of 24 meshes to 60 meshes. When it reached 49.0° C., 3 grams D-tryptophan 1 hydrochloride crystals, having a particle size of 150 meshes to 300 meshes were added as seed crystals to the solution. After seeding, the mixture was gradually cooled to 30° C. over a period of 6 hours. The solid was then separated from the liquid by a centrifugal separator and dried. The crystals were fractionated by sieving into two fractions, i.e., one having a particle size not smaller than 60 meshes, which consisted of 166 g. (including the seeded crystals) of L-tryptophan 1 hydrochloride crystals, having an optical purity of 92.6%, and the other having a particle size smaller than 60 meshes, which consisted of 161 g. (including the seeded crystals), of D-tryptophan 1 hydrochloride crystals, having an optical purity of 80.3%.

164 grams of the above obtained L-tryptophan 1 hydrochloride crystals in a particle size of not smaller than 60 meshes were added to 208 g. of hydrochloric acid solution, containing 3.87% hydrogen chloride by weight. The mixture was stirred at 30° C. for one hour. The crystals were separated from the main portion of the mother liquor by a centrifugal separator. 142 g. of L-tryptophan 1 hydrochloride, having an optical purity of 99.5%, were obtained. 140 grams of the above obtained L-tryptophan 1 hydrochloride crystals, were dissolved in 1 kg. of water at 40° C., and neutralized with an aqueous 30% sodium hydroxide solution, adjusted to pH 5.9. The solution was then cooled to 30° C. and stirred for an hour. The crystals were separated by filtration and washed with 100 g. of water. The dried crystals weighed 99 grams. Their specific rotation was $[\alpha]_D^{20} = -32.4°$ (C.=1, $H_2O$). Since the specific rotation of pure L-tryptophan is $[\alpha]_D^{20} = -32.5°$ (C.=1, $H_2O$), the optical purity of the L-tryptophan crystals obtained was 99.7%.

What we claim is:

1. A process for optically resolving D,L-tryptophan-1-hydrochloride into the optically active enantiomorphs thereof which comprises preparing a saturated or supersaturated aqueous solution of D,L-tryptophan-1-hydrochloride which contains a molar ratio of more than 1.2 free hydrogen chloride to D,L-tryptophan at a temperature ranging from 30° C. to 49.5° C., and contacting said solution with crystals of one of the enantiomorphs of said D,L-tryptophan-1-hydrochloride.

References Cited

UNITED STATES PATENTS 3,149,122  9/1964  Sasaji et al. _____ 260—326.14 T

OTHER REFERENCES

Greenstein et al.: *Chemistry of Amino Acids* (1961), vol. 1, p. 715.

Liwschitz et al.: *Chemical Abstracts*, vol. 51:17746–47 (1957).

JOSEPH A. NARCAVAGE, Primary Examiner